US009442626B2

(12) United States Patent
Schupak et al.

(10) Patent No.: US 9,442,626 B2
(45) Date of Patent: Sep. 13, 2016

(54) SYSTEMS, METHODS AND APPARATUSES FOR FACILITATING CONTENT CONSUMPTION AND SHARING THROUGH GEOGRAPHIC AND INCENTIVE BASED VIRTUAL NETWORKS

(71) Applicants: Nick Schupak, New York, NY (US); Todd Meagher, Keller, TX (US); Donald Schupak, New York, NY (US)

(72) Inventors: Nick Schupak, New York, NY (US); Todd Meagher, Keller, TX (US); Donald Schupak, New York, NY (US)

(73) Assignee: MUSIC SOCIAL, LLC, New York, NY (US)

( * ) Notice: Subject to any disclaimer, the term of this patent is extended or adjusted under 35 U.S.C. 154(b) by 606 days.

(21) Appl. No.: 13/834,956

(22) Filed: Mar. 15, 2013

(65) Prior Publication Data

US 2014/0281977 A1    Sep. 18, 2014

Related U.S. Application Data

(60) Provisional application No. 61/757,642, filed on Jan. 28, 2013, provisional application No. 61/749,029, filed on Jan. 4, 2013.

(51) Int. Cl.
*G06F 3/0481* (2013.01)
*G06F 17/30* (2006.01)

(52) U.S. Cl.
CPC ..... *G06F 3/04817* (2013.01); *G06F 17/30041* (2013.01); *G06F 17/30053* (2013.01); *G06F 17/30749* (2013.01); *G06F 17/30772* (2013.01); *G06F 2221/2111* (2013.01)

(58) Field of Classification Search
CPC .......... G06F 17/30749; G06F 17/30772; G06F 17/30041; G06F 17/30752; G06F 17/3087; G06F 3/048; G06F 2221/2111; G06F 3/04817; G06F 17/30053; H04N 21/4524; H04N 21/4825
See application file for complete search history.

(56) References Cited

U.S. PATENT DOCUMENTS

| | | | | |
|---|---|---|---|---|
| 8,035,023 B2* | 10/2011 | Hernandez | ........ | G06F 17/30755 84/600 |
| 8,332,402 B2* | 12/2012 | Forstall | ............ | G06F 17/30867 707/736 |
| 8,332,425 B2* | 12/2012 | Svendsen | .......... | G06F 17/30041 707/769 |
| 8,346,762 B2* | 1/2013 | Verosub | ............. | G06F 17/3089 707/722 |
| 8,762,413 B2* | 6/2014 | Graham, Jr. | ...... | G06F 17/30038 707/790 |
| 8,825,668 B2* | 9/2014 | Yadav | .................... | G06F 17/30 707/748 |
| 2004/0225635 A1* | 11/2004 | Toyama | ............ | G06F 17/30241 |
| 2006/0143236 A1* | 6/2006 | Wu | .................... | G06F 17/30053 |
| 2008/0004734 A1* | 1/2008 | Li | .......................... | G11B 27/34 700/94 |
| 2008/0294650 A1* | 11/2008 | Karlsson | ........... | G06F 17/30041 |
| 2009/0019004 A1* | 1/2009 | Abhyanker | ............ | G06Q 30/02 |
| 2009/0328087 A1* | 12/2009 | Higgins | ................. | H04N 7/173 725/10 |
| 2010/0010997 A1* | 1/2010 | Amidon | ............ | G06F 17/30038 707/E17.002 |
| 2010/0114934 A1* | 5/2010 | Martensson | ............ | H04W 4/02 707/769 |

(Continued)

OTHER PUBLICATIONS

Galli et al. Vertigo: Find, Enjoy and Share Media Trails across Physical and Social Contexts, 2009.*

*Primary Examiner* — Nicholas Ulrich

(57) ABSTRACT

Consumption and sharing of content, including music, is facilitated by an apparatus and a network configured to collect location information related to users of the network and the content. Users are provided with the capability to create playlists of content portions which may be graphically displayed atop a map. Location, playing and sharing information is used to evaluate the content portions, users and playlists. Content may be selected for playing by a user based on the evaluation.

20 Claims, 5 Drawing Sheets

(56) References Cited

U.S. PATENT DOCUMENTS

| | | | |
|---|---|---|---|
| 2010/0228740 A1* | 9/2010 | Cannistraro | G06F 17/30749 707/748 |
| 2011/0054646 A1* | 3/2011 | Hernandez | G06F 17/30755 700/94 |
| 2011/0279311 A1* | 11/2011 | Hamano | G06F 17/30265 342/357.25 |
| 2012/0072418 A1* | 3/2012 | Svendsen | G06F 17/30749 707/724 |
| 2012/0109345 A1* | 5/2012 | Gilliland | G11B 27/105 700/94 |
| 2012/0221687 A1* | 8/2012 | Hunter | G06F 17/30029 709/219 |
| 2013/0246522 A1* | 9/2013 | Bilinski | H04N 21/4825 709/204 |
| 2013/0263016 A1* | 10/2013 | Lehtiniemi | G06T 19/006 715/753 |
| 2013/0311452 A1* | 11/2013 | Jacoby | G06F 17/30241 707/722 |
| 2014/0031961 A1* | 1/2014 | Wansley | G06F 17/30772 700/94 |

* cited by examiner

SYSTEMS, METHODS AND APPARATUSES FOR FACILITATING CONTENT CONSUMPTION AND SHARING THROUGH GEOGRAPHIC AND INCENTIVE BASED VIRTUAL NETWORKS

CROSS-REFERENCE TO RELATED APPLICATIONS

This application claims priority to and the benefit of U.S. Provisional Patent Application No. 61/757,642, filed Jan. 28, 2013, and U.S. Provisional Patent Application No. 61/749,029, filed Jan. 4, 2013, both entitled "Systems, Methods and Apparatuses for Facilitating Music Communitites Through Geographic and Incentive Based Virtual Networks."

BACKGROUND

Music has long played a vital role in human culture. As a result, music has always had a close relationship with the development of new technological advances, whether as the driver or as an early exploiter. From the recording of music on wax phonograph cylinders by Edison, to the radio broadcasts of Marconi, to the development of vinyl records, digital audio and Compact Discs, the distribution of music from musician to listener has historically been controlled by a relative few. Music producers, record labels and radio syndicates have worked to establish themselves as the gatekeepers of the music industry, controlling who hears what and controlling where and how they hear it.

However, since the advent of the internet, the distribution and consumption of music has quickly evolved. The music listener has begun to gain control of the listening experience. Early illicit music sharing networks led the way to free internet radio and websites selling music song by song instead of album by album. Listeners and musicians now have more ways available than ever before to access and distribute music. However, with all of the great benefits the internet has brought to music, there remains a desire among listeners and musicians to connect with each other through music in more personal ways, both localized and global.

SUMMARY

In general, in one aspect, the invention features an apparatus for facilitating consumption of content, including a command receiver configured to receive a command to create a playlist which includes associated playlist location information and associated playlist composition information, the playlist composition information specifying at least one content portion, a graphical display generator configured to generate a graphical display which includes a map and a playlist icon atop the map at a location determined by the playlist location information, a graphical display modifier configured to modify the graphical display to generate a modified graphical display in response to receipt of a playlist icon selection command from the client identifying the playlist icon as having been selected by a user, the modified graphical display including a playlist detail display including a graphical identification of the at least one content portion and a play command input associated with the at least one content portion and a transceiver configured to transmit the graphical display and modified graphical display to a client.

In general, in another aspect, the invention features an apparatus for facilitating consumption of content, including a profile storage manager configured to store, in response to receiving a user profile generation command, a record of a geographic location of a user initiating the command, a play record storage manager configured to store, in response to receiving a request to play a song, a record of the play request including an identity of a user initiating the play request and an identity of the song, a comparator configured to generate a list of songs ranked according to a number of play requests received from users located within a specific geographic area and a transceiver configured to output the list of songs.

In general, in yet another aspect, the invention features an apparatus for facilitating consumption of content, including a profile storage manager configured to store, in response to receiving a user profile generation command, a record of a geographic location of a user initiating the command, a play record storage manager configured to store, in response to receiving a request to play a song, a record of the play request including an identity of a user initiating the play request and an identity of the song, a song selector configured to select, in response to a local random song play request from a particular user, a first song which has been played more than a predetermined number of times by users located within a geographic area specified by the local random song play request and a transceiver configured to output the selected first song to a client from which the local random song play request was received.

BRIEF DESCRIPTION OF THE DRAWINGS

The above mentioned and other aspects, features and advantages can be more readily understood from the following detailed description with reference to the accompanying drawings, wherein.

DETAILED DESCRIPTION

Systems, methodologies and apparatuses for facilitating content consumption and sharing through geographic and incentive based virtual networks are described herein, with reference to examples and exemplary embodiments. Specific terminology is employed in describing examples and exemplary embodiments. However, the disclosure of this patent specification is not intended to be limited to the specific terminology so selected and it is to be understood that each specific element includes all technical equivalents that operate in a similar manner.

For example, the term "client computer system" or "client" as used in this application generally refers to a mobile device (cell phone, smartphone, tablet computer, ebook reader, etc.), computer (laptop, desktop, gaming console, etc.), television display (plasma, LCD, CRT, OLED, etc.) etc. including future technologies or applications enabling the same or similar results having sufficient input, storage, processing and output capabilities to execute one or more instructions as will be described in detail herein and as will be appreciated to those skilled in the relevant arts.

As another example, the term "server" generally refers to any one or more network connected devices configured to receive and transmit information such as audio/visual content to and from a client computer system and having sufficient input, storage, processing and output capabilities to execute one or more instructions as will be described in detail herein and as will be appreciated to those skilled in the relevant arts. For example, a "cloud server" may be provided which may not actually be a single server but is a collection of one or more servers acting together as a shared collection of storage and processing resources. Such collection of servers need not all be situated in the same geographic location and may advantageously be spread out across a large area.

Figure 1:
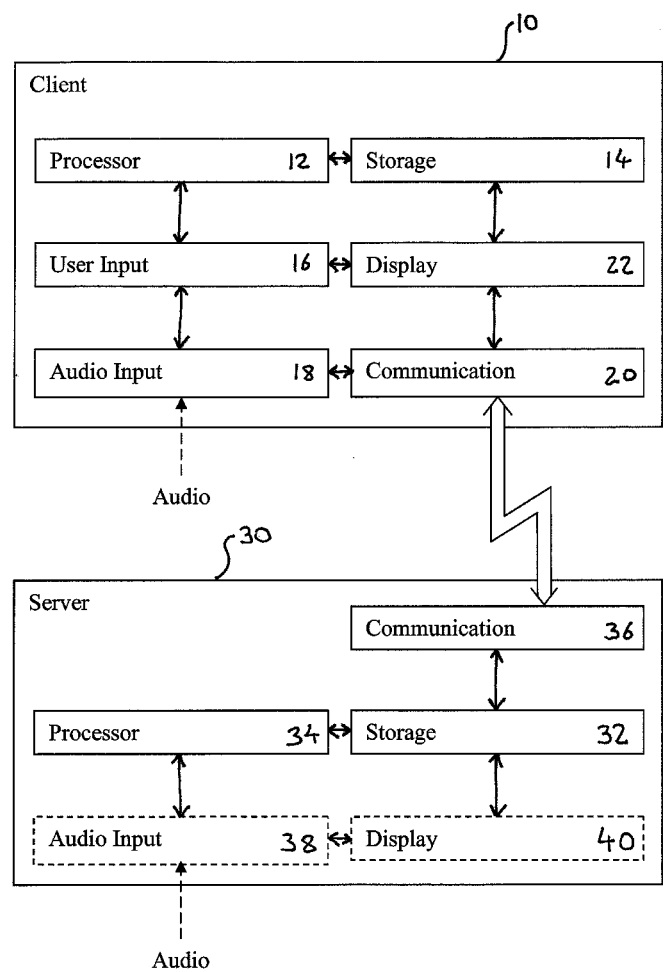
FIG. 1 is a system block diagram illustrating a client computer system and a server according to an exemplary embodiment of the present application.
Figure 4:
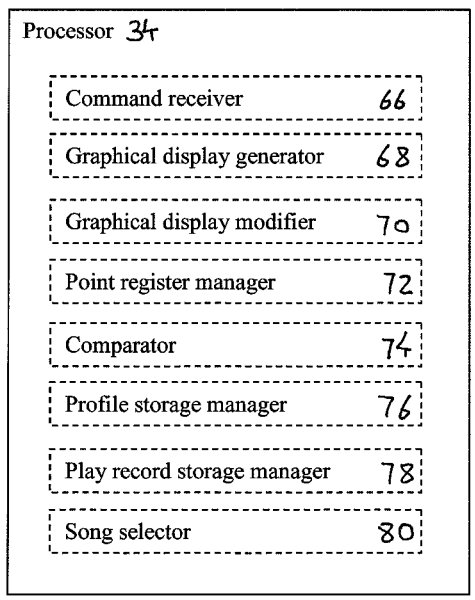
FIG. 4 is a block diagram illustrating a server processor according to an exemplary embodiment of the present application.

Examples of a client computer system and a server are shown in FIG. 1. A client computer system 10 includes a processor 12, storage 14, a user input part 16, an audio input part 18, a communication transceiver 20 and a display 22. A server 30 includes storage 32, a processor 34, and a communication transceiver 36. A server 30 may also optionally include an audio input part 38 and/or a display 40. As shown in FIG. 4, a server processor 34 may be configured to include, by physical or software configuration, for example, a command receiver 66, a graphical display generator 68, a graphical display modifier 70, a point register manager 72, a comparator 74 which may be point register comparator or a number of plays comparator, a user profile storage manager 76, a play record storage manager 78 and a song selector 80. It will be understood that each of the above processor sub-components may be implemented independently of one another or may be implemented together and may be implemented by a program including a plurality of instructions which are executed by a suitable general-purpose processor.

The term "storage" as used in this application generally refers to any (one or more of) apparatus, device, composition, and the like, capable of retaining information and/or program instructions for future use, copying, playback, execution and the like. Some examples of storage include solid state storage devices, platter-type hard drives, virtual storage media and optical storage media formats such as CDs, DVDs and BDs, etc.

Examples of user input parts include physical buttons which may be displaced by some small amount to register an input, touch-type inputs which register user input without noticeable displacement, for example capacitive or resistive sensors or buttons, a touch screen, etc. A user input part may also include, for example, a microphone and voice translation processor or program to receive voice commands, acceleration sensors to receive movement or gesture commands such as horizontal or vertical waving or tipping motions, etc. A user input part may also take the form of, for example, a keyboard, mouse, stylus, etc.

An audio input part may be any device or system of devices configured to receive audio information and make it available to other components of the client. For example, an audio input part may comprise a microphone, an analog to digital converter (A/D converter), an audio input jack for receiving analog or digital audio from a source, a portion of digital storage storing a recorded clip of audio, etc. In another example, audio already packaged in digital form or a link to a remote storage location of audio already packaged in digital form is received by a client. In this case, a communications transceiver and/or a processor may perform the function of an audio input part.

As another example, a network may be configured to allow users to create sound recordings directly into their playlist. In one example, such functionality may be implemented by a recording program module configured to receive audio signals from a microphone, line-in or other hardware audio input. A recording module may be included as a standard function of a network or playlist, or a recording module may be an item that is "earned" through either the accrual of points or by purchasing with money (described below). User-generated recordings may be limited to a certain time limit or file size, or may not be limited by any time limit or by any file size. Such user-generated recordings may appear as "tracks" within the user's playlist and therefore assume all of the functionalities of a "song" (may accrue points, may be able to be shared into other users' playlists, may be able to be "liked", etc.) or such recordings may be "hidden" from view. In one example, "tracks" are visually differentiated from "songs" in a display. Such recordings may be advertisements, personalized messages about the user or his/her playlist (a "bump"), an introduction to a particular song, or such recordings may include any other information or communication the user desires. The network may be configured to allow or implement censorship of such recordings. For example, a network administrator may be enabled to prohibit and remove a user-generated recording which includes explicit language or provocational or incendiary comments towards other users on the network. The network may be configured to allow users to report or flag such objectionable recordings to network administrator. A certain number of reports or flags may result in automatic removal of content by the network.

The communication transceiver may be a wired or wireless data communication transceiver, configured to transmit and/or receive data (which may include audio, video or other information) to and/or from a remote server or other electronic device. Such wired or wireless data communication transceiver may the same as or different from a wired or wireless audio output part. As an example, a wireless data communication transceiver may be configured to communicate data according to one or more data communication protocols, such as GSM (Global System for Mobile Communications), GPRS (General Packet Radio Service), CDMA (Code Division Multiple Access), EV-DO (Evolution-Data Optimized), EDGE (Enhanced Data Rates for GSM Evolution), 3GSM, HSPA (High Speed Packet Access), HSPA+, LTE (Long Term Evolution), LGE Advanced, DECT, WiFi™, Bluetooth™, etc. As one example, a wireless data communication transceiver may be configured to communicate data using an appropriate cellular telephone protocol to and/or from a remote internet server, for example, to download text information and/or audio information to the client.

A client or server may include one or more displays capable of displaying text or graphics. Examples of types of displays possibly comprised in a client include e-ink screens, LCD (Liquid Crystal Display), TFT (Thin Film Transistor), TFD (Thin Film Diode), OLED (Organic Light-Emitting Diode), AMOLED (Active-matrix organic light-emitting diode) displays, etc. Displays may also include additional functionality such as touch sensitivity and may comprise or at least may communicate with the user input part. For example, the display of the client may include capacitive, resistive or some other type of touch screen technology. Generally, such touch screen technology is capable of sensing the position and sometimes even the force with which a user may touch the screen with one or more of their fingers or compatible implements.

In an aspect of the present application, a client or server may execute instructions tangibly embodied in storage, using a processor, to facilitate the sharing or and/or listening to music that may include communities or other methods of communication embedded within geographic and/or incentive based virtual networks. Such instructions are generally collectively referred to herein as a "program" for convenience and brevity.

In another aspect of the present application, the term "network" as used herein generally refers to a program which allows multiple users to interact with one another and share and/or experience various formats of digital music as well as other biographical, lyrical or visual information, such as, for example, textual artist information, song lyrics, album art, user-contributed images, etc. Digital music and other information may be communicated in many ways, for example in mp3, wav, aac, mpeg, or aiff files. Digital music and other information may also be streamed in a suitably formatted data stream. Thus, the term "network" is used in a broad sense herein and generally encompasses any framework which allows users to interact with one another through a program run by a server or client or combination of server and client.

In one embodiment, a network is facilitated by a program and the network is based at least in part on geography. When first using or joining the network, users may be prompted to provide their geographic location, or at least an approximation of their location. This information may be used to plot the user's location on a map. Map-based plotting of user information allows, for example, generation of suggestions based on a user's location, collection and display of backend data on who is listening to what from where, or selective display of relevant advertisements pursuant to a particular user's current or permanent location. When many users' locations are plotted on the map, or other visual geographic display, which could include a list, tile or cascade of relevant images, users may be provided with the ability to browse, search, communicate with, or otherwise interact with other users and/or content other users make available. There are many examples of currently existing networks, for example, Facebook, Myspace and Instagram.

In another example, the network can be accessed by a user regardless of whether or not they have created an account. Such users may be permitted to interact with all or less than all features of the network. In one instance, a user who has not created an account may be permitted to stream any piece of content that has been shared with the network but points (discussed below) for signed-up users may not accrue as a result of such activity. In another instance, a user who has not signed up may be permitted to utilize "chat" features of the network (discussed below) only by first logging in through another network (Facebook, Twitter, etc.). In still another instance, a user who has not signed up may accrue points for themself simply by interacting with the content (streaming content, "liking" content or playlists, sharing information on the network or to 3rd party networks, etc.) but may be prompted to sign up in order to redeem those points for in-game or real world rewards or awards/incentives.

Networks may also be configured to allow users to promote music to other users. For example, a user who promotes a song, referred to herein as a promoter, may upload the song from their client to a server and publish a link to the song for other users to follow. In another example, a promoter may provide a link to a song's pre-existing location on the internet for other users to follow. In yet another example, a promoter may initiate a program to isolate audio from an audiovisual representation of a song which is uploaded by the user or which is stored at a pre-existing location on the internet. In a further example, a song may be uploaded or linked to in audio visual form, such as in the example of a music video or a video recording of a concert performance. In addition to the import of the song itself from a pre-existing location, related data may be similarly imported along with the song. For example, "metadata" about the song such as the artist's name, genre, release date, etc. may be culled either automatically from the song's source or via manual user input. Promoters may be provided with the ability through the network to promote multiple songs at a time, for example in the form of a "playlist".

Users may be incentivized to perform various actions on the network. For example, users may be assigned "points" for uploading a song, listening to a song, etc. Points may or may not be redeemable for prizes or network enhancements. Points may also be used to organize or rank users on a global or local scale.

Songs may also accrue points. For example, a song may be assigned a point every time it is listened to, shared, "favorited," linked to or otherwise interacted with. Accordingly, songs may be ranked relative to one another locally or globally based on the number of points they have accrued.

An example of a network will now be described in more detail. Upon joining the network, users may be prompted to enter information about themselves. Entry of the information may be optional or mandatory. Categories of information a user may be asked to provide include their name, their geographic location, their age, their preferred music genre, whether they are a musician, what school they go to, where they work, their favorite or usual way of listening to music (i.e. in the car, from their phone, with an iPod, on their home stereo, etc.), their affiliation with bands or music venues, etc. With regard to the geographic information of a user, the user may be given the option of supplying a generic location, for example a zip code or town name, if privacy is a concern. In another example, a user may grant permission to allow a GPS location device to provide the geographic location of the user. For example, a user may opt to allow their mobile phone or tablet or laptop computer to transmit GPS coordinates corresponding to the user's current location (which may be determined by an on-board GPS location sensor) to a server. User information may be stored in a suitably formatted database on a server, for example.

Such user information may be used to populate a user profile. A user profile may be, for example, a collection of data about the user which may be presented on a user profile webpage. A profile may contain information about the user which they entered themselves and a profile may also contain information gathered about the user or information about the user which may be added automatically or by others.

A user profile may also include information regarding the user's activity within the network. For example, a user profile may be configured to display identifications of other users who have "liked" that user's playlist, marked a song from that user's playlist as a "favorite," added a song from that user's playlist to their own playlist, purchased a song from that user's playlist, etc. Similarly, a user's profile may be configured to display an indication of other playlists or songs which are also liked by people who like that user's playlist.

The network may be configured to allow each user to establish one or more playlists of songs. In one example, a user is only allowed to have one playlist. Each playlist may include references to one or more songs. In one example, playlists may be limited to a maximum number of songs. Playlists may be graphically displayed as a collection of songs, but need not be displayed as a traditional list. A playlist may be embedded within a display or may be "popped out" as a separate "window" overlaid atop a background display or interface. A playlist may include information about the songs, such as artist, length, genre, etc. A playlist may also contain information about the playlist itself, such as, for example, the inspiration behind the playlist or a note about the playlist's history. For example, a user may establish a playlist of songs played by a particular band at a particular live show.

In another example, a network may be configured to allow a user to earn or purchase (as discussed in more detail below) the ability to maintain more than one playlist. In one example, multiple playlists may displayed in the same display. In this example, the multiple playlists may be accessed by the user or other users by selecting from a drop-down menu, clicking an arrow or other like visual representation to switch from one playlist to another, by utilizing touch-screen capabilities of a client to "slide" between playlists, by typing a command, by utilizing voice-recognition capabilities of a client or by other means to switch from viewing one playlist to viewing another. In another example, multiple playlists may be displayed as separate entities in the network. For example, the multiple playlists may be displayed as separate icons atop a map, in a text-based list, as cascading or tiled image or image sets, etc. and could be accompanied by text or other media or content. A user who operates one or multiple playlists may choose to allow another user or other users to access or control/populate any or all of their playlists. Further, a user who operates multiple playlists may be provided with the ability to move points accrued by one playlist into another playlist' point register. For example, a user might want to do so in order to "unlock" certain achievements for a playlist. As one example, if a user has established a very popular playlist and has earned, purchased or otherwise acquired the capacity to operate and populate another or new playlist, they may wish to allot points to that new playlist in order to accelerate the rate at which that new playlist accrues points towards incentives or rewards.

Songs may be uploaded by a user from a client to a server which also runs the network. In another example, users may upload songs to third party servers. In another example, users may provide a link to a song's previously existing storage location on a server. In any event, a user may add a song to their playlist and provide listening access to the song to other users of the network. In one example, a playlist contains a command input such as a link or button which a user may click on to begin playback of the song through their client's audio output facilities. Another way users may populate their playlist is by adding songs from other user's playlists. An "add" control may be displayed for each song on a playlist to facilitate adding songs from other users' playlists. In another example, a user may choose not to populate a playlist but may browse, listen to or otherwise interact with other users or the content those other users make available. In still another example, a user may be provided with an option for "random play" which, if activated, causes playback of randomly selected songs, or randomly selected songs meeting user-defined parameters such as genre. Other playback examples are described in more detail below.

It should be noted that the terms "song" and "music" are used herein merely as examples of a particular implementation of the present invention and are not limiting. For example, the present invention may be implemented for developing communities focused on the sharing of music videos, other types of videos, comedy routines, poetry readings, short stories, newspaper articles, video games, silent films, animated shorts, etc. In another example, different types of content may be shared on the same network. Thus, the terms "song" and "music" as used herein should be understood in a more general context as referring to "a particular piece of audio and/or visual content" and "audio and/or visual content," respectively.

Figure 2:
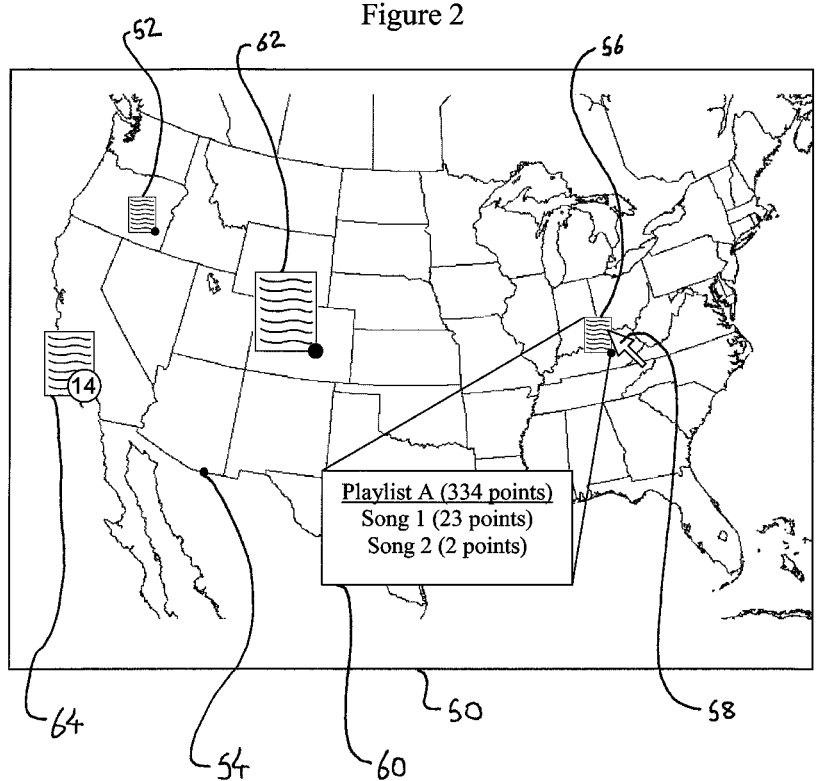
FIG. 2 is notional view of a graphic display according to another exemplary embodiment of the present application.

An interactive portal into the network may be provided to clients in the form of an interactive webpage, phone or tablet application, etc. The portal may be configured with various graphically arranged overlays which, for example, may overlay a map. An example of such a graphical display 50 is shown in FIG. 2. Users' location information may be used to identify the location of the promoter and/or facilitate viewing and/or listening to the music and/or accessing related information (biographical, lyrical content, album art, user-contributed images, etc.) on the playlist. Playlists may be identified as icons or text. In one example, the presence of a playlist may be indicated by an icon 52 placed on the map 54 at the location of the user, a location specified by the user or some other location on the map. Users may click a playlist icon 56 with a cursor 58 to cause the playlist to dynamically grow from the icon into a mini-window 60 overlaid atop the map to fully display the playlist. In one example, the size of a playlist icon is variable and is configured to grow proportionally to a playlists' or an owner's popularity or point total. For example, playlist icon 62 is larger than playlist icon 53. Further discussion regarding points and their integration is provided below. Playlist icons may be grouped together at wider zoom levels. For example, when a user views the network map at a high-level zoom, the number of playlist icons to be displayed may become very large and may confusingly overlap one another if not consolidated. In this case, a numerical indicator 64 of how many playlists are available in a given area may be displayed in lieu of the playlist icons themselves.

Figure 3:
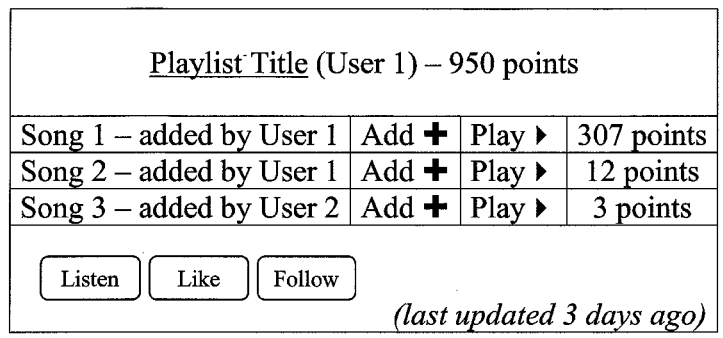
FIG. 3 is a notional view of a playlist graphical display according to another exemplary embodiment of the present application.

FIG. 3 shows an example of a fully displayed playlist. A fully displayed playlist may include information about, for example, the songs comprising the playlist, the user who is the owner of the playlist, the popularity of the playlist, the individual popularity of songs on the playlist, the collective total popularity of songs on the playlist, a date the playlist was created or last updated, etc. Playlists may be displayed with controls for interacting with the playlist and songs comprising the playlist. For example, a listen button may allow a user to begin listening to the songs in the playlist. A playlist may be provided with a control for users to listen to songs in the order specified by the owner or in a random order. Likewise, controls may be provided for each song in a playlist to listen to the songs individually. A playlist may also be provided with controls for a first user to add a song from a second user's playlist to a playlist owned by the first user.

A point system may be integrated into the network. Points may be assigned, for example, to incentivize user behavior and/or track popularity. For example, each user, playlist, song, geographical area, etc. may be provided with a point register.

As an example, points may be added to a first user's register for (any one or more of): uploading a song, adding a song to a playlist, listening to a full song, listening to a part of a song (i.e. listening to at least a predetermined fraction of the song or listening to a song for at least a predetermined amount of time), "liking" a song, "disliking" a song, "following" another user or their playlist, buying a song from a vendor or from the network provider via a link displayed by the network, another user listening to a song (or listening to at least a predetermined fraction of the song or listening to the song for at least a predetermined amount of time) uploaded or listed on the first user's playlist, another user expanding the first user's playlist form an icon on the network map, another user operating a control on the first user's playlist (such as a "listen" button), another user choosing to "follow" the first user, another user "liking" the first user, a song uploaded or listed by the first user or a playlist owned by the first user, etc. Points may be removed from a first user's register for (any one or more of): another user choosing to "un-follow" the first user, another user "disliking" a song uploaded or listed to by the first user.

As another example, points may be added to a playlist's register for (any one or more of): a user listening to all of a listed song, a user listening to a part of a listed song (i.e. listening to at least a predetermined fraction of the song or listening to a song for at least a predetermined amount of time), a user "liking" the playlist or a listed song, a user "following" the playlist, etc. Points may be removed from a playlist's register for (any one or more of): a user "un-liking" or "un-following" the playlist, etc. Points in a playlist register may be linked to the owner's register or may be maintained separately.

As yet another example, points may be added to a song's register for (any one or more of): a user "liking" the song, a user listening to part of the song (i.e. listening to at least a predetermined fraction of the song or listening to a song for at least a predetermined amount of time), a user listening to all of the song, a user uploading the song, a user adding the song to their playlist, a user purchasing the song, etc. Points may be removed from the song register for (any one or more of): a user "unliking" the song, a user removing the song from their playlist, the song not being played by any user or by a predetermined number of users for a predetermined amount of time, etc.

Points may hold their value over time or points may be configured to decay in value over time. For example, points may have a predetermined life span or a reduced value over time. As one example, a point may only remain in a register for a week until it is removed. As another example, a point may decrease in value from a full point by 5% per day until the point is fully removed from a register. In another example, all points in a register may be completely removed periodically.

The presence or lack of a predetermined amount of points in a register over time may have consequences for the associated user, song or playlist. For example, a user with a sustained large amount of points in their associated register may be offered VIP status or advertising opportunities, either automatically once they maintain at least a predetermined amount of points in their register for at least a predetermined period of time or as a result of a manual review. As another example, a song may be automatically removed from a playlist if it fails to maintain or achieve a predetermined amount of points in its associated register. Similarly, a playlist may be automatically removed from a map if the playlist fails to maintain or achieve a predetermined amount of points.

User or playlist points may be exchangeable for goods or enhancements or may simply be an indicator of popularity or success. In one example, points may be exchanged for merchandise, for example stickers or apparel. In another example, points may be redeemed for network enhancements. Examples of network enhancements include: a higher number of songs allowed per playlist, a larger number of allowed playlists per user, an enhanced profile page, a different player or network interface "skin," a different representative map icon, etc. Such network enhancements may also be purchasable for money. In addition, as alluded to above, a point tier system may be established hereby users who reach predetermined levels of points may be granted corresponding levels of "VIP" status which may confer the perception of prestige and/or network enhancements. For example, badges may be automatically added to a user's playlist to indicate the successful accomplishment of a predetermined achievement. As an example, a user's playlist may be automatically provided with a badge to indicate the playlist's "Top 5" ranking among other playlists in the area, the playlist having exceeded a predetermined point level at one time or in its lifetime, etc. Songs may also be awarded badges or given preeminent display position based on their points totals or other achievements. For example, a banner displayed on a user's network portal may be configured to identify the "top song in the world" based on points or other information. The banner may also display information indicating how long that song has been entitled to a superlative identification, for example a display of "time at the top."

In another aspect, a user may earn, purchase (with points or money) or otherwise acquire the capability to tailor/customize his/her interface. An example of a customized interface would be a visual representation of content and information within a network that is organized atop a user-contributed or user-defined static or animated image, for instance, a family photo. A customized interface may be configured to allow a user to organize the display of nodes (described below), modules, menus, content and information within the network in such a way as to suit their browsing, searching, sharing and interacting preferences. In one example, a user may be enabled to organize nodes, modules, menus, content and information in a way that resembles his/her desktop. In another example, a user may be enabled to organize nodes, modules, menus, content and information in such a way as to resemble another existing network.

In addition to the point system, other information may be recorded in response to the occurrence of certain events. For example, when a play command is received by a server from a client, the server may be configured to store a log of the event which may include, for example, information relating to the user which initiated the play command such as their location or other demographic information of the initiating user, a time and/or day of the request, a length of time that the song is played, a volume level of the client's audio output, etc. Such event logs may be formatted in a database or other suitable data structure. In the above example, songs and playlists may be evaluated and compared to one another for popularity within a given geographic area or among users of a certain demographic. Such comparison may form the basis for generating a graphic display such as a chart which compares the relative popularity of a song or playlist within a certain geographic area or among a certain demographic of user. In addition, the popularity of songs and playlists may be compared within a certain genre or type of music. For example, a chart of popular songs may be generated only for those songs which are classified as country songs. Such genre classification may be an element of information submitted when the song is first added to a playlist, may, for example, be suggested by users other than the user who originally submitted the song or may be automatically evaluated based on a computer-implemented algorithm.

The collection of such other information, in addition to the location information of users, playlists and songs, allows for many opportunities to mine the collection of data for various purposes. For example, advertisers, as described below, may be interested in learning which music venues (who may have established a playlist of their own) are popular in a given area, which bands are popular among a given demographic of user, what time of day users of a certain demographic are most likely to be listening to music through the network, etc. As another example, a band manager may be interested in learning where their band is popular before planning a concert tour.

Advertising may also be integrated into the program and may take many forms. For example, audio advertisements may be inserted into playlists (optionally accompanied by a graphical representation of the advertisement in the graphical depiction of the playlist) or played at specified times during a user's interaction with the network, graphic advertisements may be overlaid on the graphic display or inserted into playlists, etc. As one example, a scrolling text bar, or "ticker" may be graphically overlaid atop the display which may include textual advertisements. These textual advertisements may also be interactive, responding to a user's clicking on the text or hovering a pointer over the text. For example, the ticker may include hyperlinks to web pages maintained by the advertiser. Advertisements may also take the form of a playlist or interface skin. As one example, an advertiser whose product is a candy bar may choose to place an advertisement in which a user's playlist takes the form of the candy bar and is colored according to the candy bar's well known wrapper design. In another example, graphic advertisements may be overlaid a map, regions of a map or another interface element. For example, a network interface display may include a map showing the five boroughs of New York City and different advertisements may be overlaid or watermarked over the different boroughs as they are depicted on the map.

Advertisers, in exchange for monetary or other compensation, may be given the ability to tailor their advertising to their specific needs or desires. For example, as discussed above, data mining may be used to tailor placement of advertisements for a specific goal. For example, in the candy bar example, above, the advertiser may only wish to place the advertisement on playlists which include rock music, which have over a predetermined amount of points in an associated register, and are which are among the most popular playlists in a specific neighborhood during the period between 6 pm and 11 pm on weekends.

In another example, users may be provided with the option to seek out advertisers or advertisements for their associated playlist in return for additional points or monetary compensation. For example, a user with a popular playlist may be presented with the option of selecting an advertiser's skin for their playlist in return for a predetermined amount of points. The points attributed to the selection of the playlist skin may be transferred in a single deposit or may be configured to accrue over time or with the completion of certain goals of the playlist. As one example, points for advertisement skins may be added to a playlists' or user's associated point register each time (or once every specific number of times) another user views the playlist, plays a song on the playlist, etc.

The network described herein may also be integrated with other networks to provide synergistic benefits. For example, the network described herein may be integrated with or tied to a social network in which users are able to post public, semi-public or private massage with one another, share photographs, etc. User's profiles in the present network may be tied to their profiles in such other networks. Such integration may increase the amount of information able to be mined from the music listening habits of users and the popularity of songs and playlists on the present network.

In another aspect, a network may be configured to allow users to communicate with one another via a live (i.e. in real time) or message-based (i.e. email or email-like private messaging) chatting system. The "chat" system may be configured to allow users to type written messages to one another, share links to playlists, user profiles, songs or other URLs (Universal Resource Locators), etc., or to engage in a real-time voice chat and/or video chat. The "chat" system may also be configured to allow users to create "chat rooms" where multiple users may engage in a real-time or message-based conversation. Chat systems may be configured with the capacity to save and catalog the conversations or the systems may be configured with an automatic and/or a user or administrator-activated reset function.

A "chat" or "chat room" may be configured to include embedded advertising. Embeddable advertisements may include, for example, banner-type static or animated images, audio and/or video advertisements, web URLs or unique links to particular users' playlists on the network or specific content or information within the system, etc.

Some or all chat features may also be implemented by one or more programs wholly or partially embodied in a downloadable, stand-alone application/module that may be configured to not require a user to logon to the network in order to be able to chat and communicate with other users. In one example, a downloadable communication application/module could be configured to act as an alert system. For example, a communication module may be configured to notify a user of an instance of an alert, which may be triggered when a user, a user's friend, a user's follower, a user within a certain geographic proximity to another user, etc. accrues a predetermined threshold number of points associated with their playlist(s) or shares a new song. In another example, an alert may be triggered when one user has shared a song from another user's playlist. In still another example, an alert may be triggered when a network administrator introduces a new function, such as a new user icon from which to select, a new opportunity to link into an advertising program, a new search/browsing mechanism, etc. or when a network administrator issues a message to all users.

A downloadable communication application/module may be configured to permit messaging of hyperlinks to any web URL or unique links to a user's playlists or specific content that is stored within the network.

The downloadable communication application/module may also be configured to allow for screen-sharing between one or more users' clients. The communication system may also be configured to allow for file sharing between users or for the use of static or animated emoticons, GIFs (Graphics Interchange Format files) or the like as well as text of various styles and colors, and may also be configured to allow users to generate unique backgrounds or choose from a selection of system-generated backgrounds or images.

In one aspect of the present application, briefly mentioned above, users may "follow" other users, other playlists or songs. Such action may subscribe a following user to receive notifications or updates related to the followed entity. A user may be permitted to follow multiple entities and the number of entities a user may follow may be unlimited or may be limited to a predetermined number.

As one example, a user may be permitted to follow one or more playlists and may be provided with a player aggregating songs from all of the followed playlist(s). Playback of songs from the followed playlist(s) may be at the manual direction of the user or may be configured to follow a random order chosen by the network. In another example, a user may choose to play randomly selected songs from playlists owned by users they follow. In yet another example, randomly selected songs from playlists owned by users they follow may be played after that user's playlist is finished playing.

In addition, randomly selected songs may be selected from other sources, in addition to playlists owned by other followed users. For example, the network may be configured to analyze a user's playing, following, liking, adding or purchasing habits to determine a preferred genre (or other classification type, i.e., beats per minute, release date, etc.). Songs may be randomly selected from users and playlists throughout the network, regardless of any previous connection (or lack thereof) to the user, for random playback in a user's network portal. Random selection may also take into account other factors, for example how many points a song has, how long the song has been available on the network, etc. In another example, a user may impose limits or filters to manually adjust the random selection of songs for playback. As just one example, a user may be provided with the option to limit randomly selected songs based on a location of the user who uploaded the song. In another example, a user may be presented with the option to randomly play songs from playlists that another user has liked, followed, played, etc. A user ay be presented with an option to skip a currently playing song or may be prohibited from skipping a currently playing song.

In another aspect, the network may be configured to allow users to "bookmark" songs for later playback. "Bookmarking" a song may be considered similar to "favoriting" a song, but with several distinctions. For example, a user may be provided with the ability to play a queue of bookmarked songs which they have cultivated from throughout the network without committing to applying their public approval of the songs in the way favoriting them might. In another example, a user may be provided with the ability to create different categories of bookmarks. For example, a user may choose to configure "gym," "chill" and "dance party" bookmark categories. Songs tagged with bookmarks in those categories may later populate separate playing queues playable by the user at different desired times.

In another aspect of the present application, songs may be recommended to a user based on their preferences, the songs in their playlist, the popularity of other songs near their location, etc. For example, a user may be presented with a player configured to randomly play songs which are ranked at least above a predetermined percentage of other songs in the user's geographic area (or an area of their choosing) and which are classified in a genre specified by the user. Of course, such tailored player may not be confined to a particular geographic area and may be configured to randomly play songs without regard to the location of the user.

Figure 5:
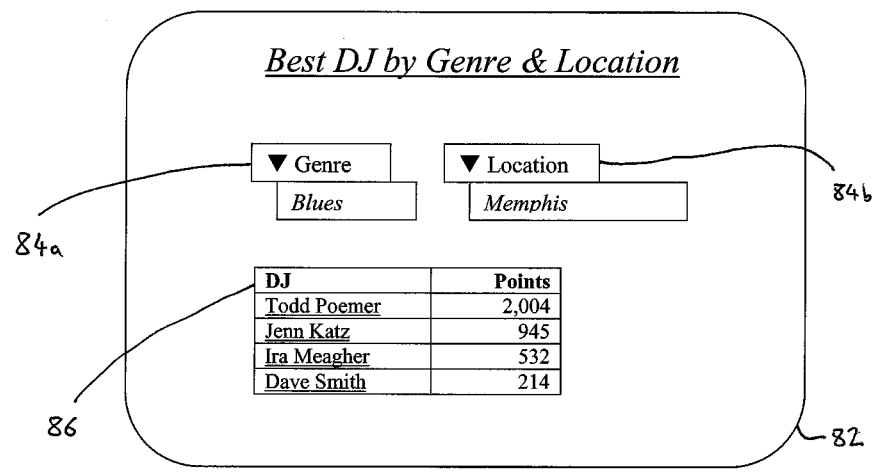
FIG. 5 is a notional view of a display according to another exemplary embodiment of the present application.

In another aspect, a network may be implemented which is not visually represented in the context of a map or similar geographic tools. For example, shared content, user-generated/provided information and all modules within a network may be represented by visual means not limited to the representation of a map or restricted to organization by user location. In example, content, information and modules are visually represented by text-based lists, as shown, for example, in FIG. 5. In FIG. 5, a display screen 82 includes selectors 84a and 84b for narrowing a search for the best (as determined by point total in the example shown) DJ within a particular genre of music (as determined by an averaged assessment of songs in their playlist(s)) and within a particular geographic area. A chart 86 is generated and displayed according to user selection of discrimination criteria selected by operation of selectors 84a and 84b.

Figure 6:
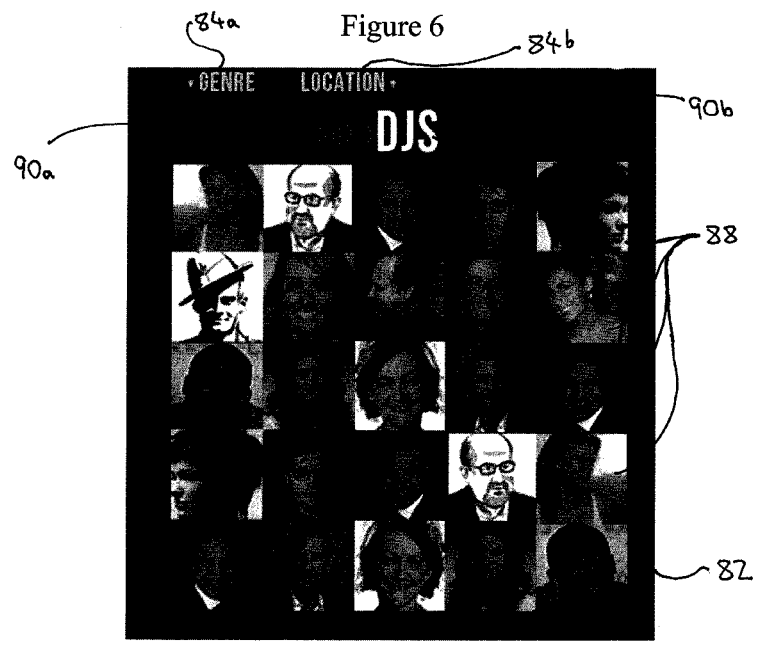
FIG. 6 is a notional view of another display according to another exemplary embodiment of the present application.
Figure 7:
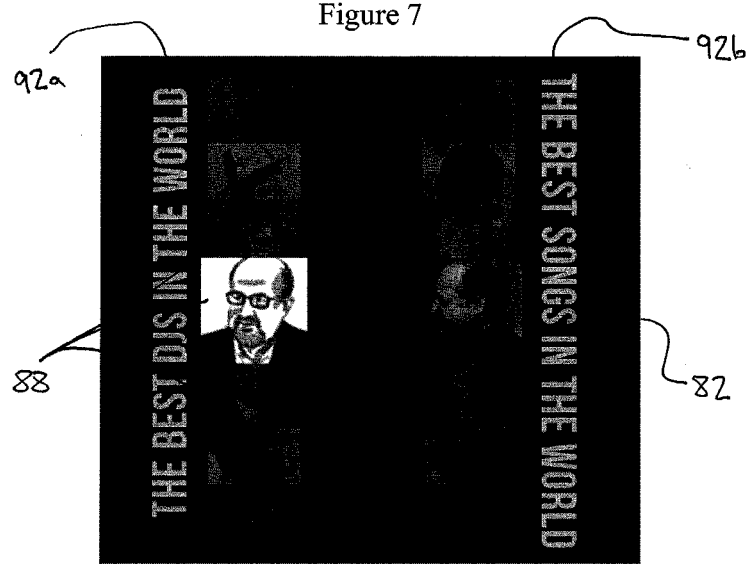
FIG. 7 is a notional view of yet another display according to another exemplary embodiment of the present application.
Figure 8:
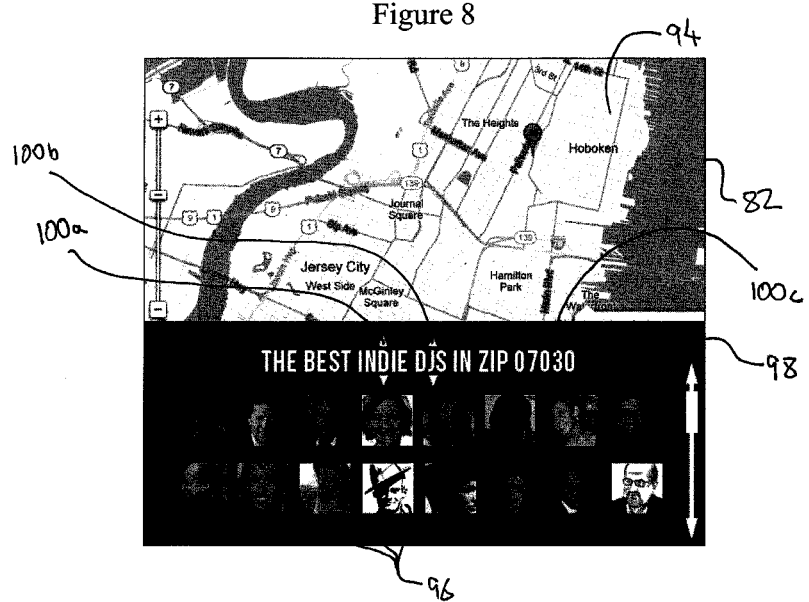
FIG. 8 is a notional view of still another display according to another exemplary embodiment of the present application.

In another example, content, information and modules may be visually represented by one or more nodes that may contain images, links or text. In one example, content, information and modules may be represented by tiled or cascaded images that may represent access to further content, information or modules within the system. For example, as shown in FIGS. 6 and 7, nodes 88 are configured to display user-submitted representative images or avatars which, upon clicking using a mouse or other user input cause a user's display to display a detailed view of that user's profile or playlist(s). In another example, songs or playlists may be represented by nodes. As shown in FIG. 6, additional selectors 90a and 90b may be generated and displayed to allow a user to select between DJs and songs as categories of nodes which are displayed. In FIG. 7, a display 82 is generated which shows nodes 88 for pre-selected categories 92a and 92b, "the best DJs in the world" and "the best songs in the world," respectively, in the example shown in FIG. 7. In another example, shown in FIG. 8, a hybrid map and non-map interface is shown in which a map 94 is displayed in a portion of the display 82 and related nodes 96 are displayed in another portion 98 of the display 82. In the example shown, user inputs 100a, 100b and 100c are presented to allow the user to filter search results according to genre, entity (playlist, dj, song, etc.) and location, respectively. Search results are represented by nodes 96 shown in display portion 98.

In another example, content, information and/or modules within the network may be configured to be displayed atop a backdrop that may represent a particular user, a particular song, information relevant to a particular song or content, information relevant to a particular region, etc. For example, an image of Istanbul may be configured as a background image in a display to represent that the current most-played song on the network was introduced to the network from a user located in Istanbul.

In addition, the embodiments and examples above are illustrative, and many variations can be introduced to them without departing from the spirit of the disclosure or from the scope of the appended claims. For example, elements and/or features of different illustrative and exemplary embodiments herein may be combined with each other and/or substituted for each other within the scope of this disclosure.

What is claimed is:

1. An apparatus for facilitating consumption of content, comprising:
   at least one processor for:
      receiving a command to create a playlist which includes associated playlist location information and associated playlist composition information, the playlist composition information specifying at least one content portion;

generating a graphical display which includes a map and a playlist icon atop the map at a location determined by the playlist location information; and modifying the graphical display to generate a modified graphical display in response to receipt of a playlist icon selection command from a client identifying the playlist icon as having been selected by a user, the modified graphical display including a playlist detail display including a graphical identification of the at least one content portion and a play command input associated with the at least one content portion; and a transceiver for transmitting the graphical display and modified graphical display to the client.

2. The apparatus of claim 1, wherein the playlist creation command further includes the at least one content portion.

3. The apparatus of claim 1, wherein the playlist creation command further includes an identification of a storage location of the at least one content portion.

4. The apparatus of claim 1, wherein the at least one processor increments a point register associated with the at least one content portion upon receipt of a play command associated with a user having activated the play control input associated with the at least one content portion.

5. The apparatus of claim 4, wherein:

the at least one processor generates, in response to a content portion comparison request from a client, a graphical comparison of point registers associated with a plurality of content portions; and the transceiver transmits the graphical comparison to the client.

6. The apparatus of claim 1, wherein:

the at least one processor:

receives a play command from a playing client associated with a playing user having activated the play control input associated with the at least one content portion, the play command including at least one of an identification of a location of the playing user and an identification of a profile associated with the playing user which includes an identification of the location of the playing user; and increments a point register associated with the at least one content portion upon receipt of the play command and recording the location of the playing user in association with the point register increment; and the transceiver transmits the at least one content portion associated with the play command to the playing client.

7. The apparatus of claim 6, wherein:

the at least one processor:

receives a local content portion comparison request from a requesting client which includes an identification of a limited geographic area; and generates, in response to the local content portion comparison request, a local graphical comparison of total point register increment occurrences only related to playing users which are inside the limited geographic area for a plurality of content portions; and the transceiver transmits the local graphical comparison to the client.

8. The apparatus of claim 1, wherein the at least one processor increments a point register associated with the playlist in response to the receipt of the playlist icon selection command.

9. The apparatus of claim 1, wherein the at least one processor increments a point register associated with a user associated with the playlist creation command in response to the receipt of the playlist icon selection command.

10. The apparatus of claim 8, wherein the at least one processor increments the point register associated with the playlist each time a play command is received from a playing client associated with a playing user having activated the play control input associated with the at least one content portion.

11. The apparatus of claim 10, wherein the at least one processor sizes a first playlist icon and a second playlist icon differently, the respective icon sizes being determined based on point registers associated with playlists associated with the respective playlist icons.

12. A method for facilitating consumption of content, comprising:

receiving a command to create a playlist which includes associated playlist location information and associated playlist composition information, the playlist composition information specifying at least one content portion;

generating a graphical display which includes a map and a playlist icon atop the map at a location determined by the playlist location information;

modifying the graphical display to generate a modified graphical display in response to receipt of a playlist icon selection command from a client identifying the playlist icon as having been selected by a user, the modified graphical display including a playlist detail display including a graphical identification of the at least one content portion and a play command input associated with the at least one content portion; and transmitting the graphical display and modified graphical display to the client.

13. The method of claim 12, wherein the playlist creation command further includes the at least one content portion.

14. The method of claim 12, wherein the playlist creation command further includes an identification of a storage location of the at least one content portion.

15. The method of claim 12, further comprising:

incrementing a point register associated with the at least one content portion upon receipt of a play command associated with a user having activated the play control input associated with the at least one content portion.

16. The method of claim 15, further comprising:

generating, in response to a content portion comparison request from a client, a graphical comparison of point registers associated with a plurality of content portions; and transmitting the graphical comparison to the client.

17. The method of claim 12, further comprising:

receiving a play command from a playing client associated with a playing user having activated the play control input associated with the at least one content portion, the play command including at least one of an identification of a location of the playing user and an identification of a profile associated with the playing user which includes an identification of the location of the playing user;

incrementing a point register associated with the at least one content portion upon receipt of the play command and recording the location of the playing user in association with the point register increment; and transmitting the at least one content portion associated with the play command to the playing client.

18. The method of claim 17, further comprising:

receiving a local content portion comparison request from a requesting client which includes an identification of a limited geographic area;

generating, in response to the local content portion comparison request, a local graphical comparison of total point register increment occurrences only related to playing users which are inside the limited geographic area for a plurality of content portions; and transmitting the local graphical comparison to the client.

19. The method of claim 12, further comprising incrementing at least one of:
   a point register associated with the playlist in response the receipt of the playlist icon selection command;
   a point register associated with a user associated with the playlist creation command in response to the receipt of the playlist icon selection command; and
   the point register associated with the playlist each time a play command is received from a playing client associated with a playing user having activated the play control input associated with the at least one content portion.

20. The method of claim 19, further comprising sizing a first playlist icon and a second playlist icon differently, the respective icon sizes being determined based on point registers associated with playlists associated with the respective playlist icons.

\* \* \* \* \*